(12) United States Patent
Dimitriadis

(10) Patent No.: US 8,825,374 B2
(45) Date of Patent: Sep. 2, 2014

(54) NAVIGATION ROUTE UPDATES

(75) Inventor: Dimitrios Dimitriadis, Rutherford, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 13/489,020

(22) Filed: Jun. 5, 2012

(65) Prior Publication Data

US 2013/0325320 A1 Dec. 5, 2013

(51) Int. Cl.
*G01C 21/34* (2006.01)
*G01C 21/00* (2006.01)
*G01C 21/36* (2006.01)

(52) U.S. Cl.
CPC .............. *G01C 21/00* (2013.01); *G01C 21/34* (2013.01); *G01C 21/3605* (2013.01); *G01C 21/3691* (2013.01)
USPC .......................................... 701/411; 701/420

(58) Field of Classification Search
CPC .... G01C 21/00; G01C 21/34; G01C 21/3605; G01C 21/3691
USPC ......................................... 701/414, 411, 420
See application file for complete search history.

(56) References Cited

U.S. PATENT DOCUMENTS

| | | | | |
|---|---|---|---|---|
| 6,845,322 | B1* | 1/2005 | Chao et al. ..................... | 701/411 |
| 7,363,117 | B2 | 4/2008 | Tengler et al. | |
| 8,260,546 | B2* | 9/2012 | Soelberg ........................ | 701/410 |
| 8,332,141 | B2* | 12/2012 | Couckuyt ...................... | 701/430 |
| 2007/0106465 | A1* | 5/2007 | Adam et al. ................... | 701/209 |
| 2009/0248283 | A1 | 10/2009 | Bicego, Jr. | |
| 2010/0106603 | A1* | 4/2010 | Dey et al. ..................... | 705/14.63 |
| 2010/0145601 | A1 | 6/2010 | Kurtti et al. | |
| 2010/0205060 | A1* | 8/2010 | Athsani et al. ............. | 705/14.58 |
| 2011/0098918 | A1* | 4/2011 | Siliski et al. .................. | 701/201 |
| 2011/0144899 | A1* | 6/2011 | Soelberg ....................... | 701/200 |
| 2011/0238752 | A1 | 9/2011 | Weiss et al. | |
| 2011/0313654 | A1* | 12/2011 | Olson et al. ................... | 701/201 |
| 2012/0022786 | A1* | 1/2012 | Siliski et al. .................. | 701/527 |
| 2012/0060008 | A1* | 3/2012 | Matsushima et al. ......... | 711/163 |
| 2012/0078496 | A1* | 3/2012 | Lindhuber et al. ............ | 701/123 |
| 2012/0303264 | A1* | 11/2012 | Su et al. ........................ | 701/416 |
| 2013/0138335 | A1* | 5/2013 | Lei ................................ | 701/408 |
| 2013/0261870 | A1* | 10/2013 | Halder et al. .................... | 701/25 |
| 2014/0005940 | A1* | 1/2014 | Suzuki, Toshikazu ........ | 701/527 |

FOREIGN PATENT DOCUMENTS

EP 2377272 A2 * 10/2011
WO WO 2011148611 A1 * 12/2011

OTHER PUBLICATIONS

TeleNav, "Get out of the Jam," [http://www.telenav.com/products/tn/traffic.html] accessed Mar. 26, 2012.
Freeman, Matt, "Traffic Information Services," [http://www.crutchfield.com/learn/learningcenter/car/navigation/traffic_services.html?search=traffic_information_services] Jun. 23, 2007.

(Continued)

*Primary Examiner* — Tuan C. To
(74) *Attorney, Agent, or Firm* — Hartman & Citrin LLC

(57) ABSTRACT

Concepts and technologies are disclosed herein for providing navigation routes and/or providing navigation route updates. According to various embodiments of the concepts and technologies disclosed herein, a navigation application can be configured to obtain route data from a routing service. The routing service can be configured to use navigation data locally stored and/or obtained from a number of sources to generate navigation routes and/or to update navigation routes. The generated and/or updated navigation routes can be provided to the user device as route data that can be used to provide navigation directions to a user.

20 Claims, 12 Drawing Sheets

(56) References Cited

OTHER PUBLICATIONS

Moor, Chris, "Waze for Android, social networking meets GPS nav," [http://www.talkandroid.com/16463-waze-for-android-social-networking-meets-gps-nav/] Oct. 5, 2010.
TomTom, "The Fastest Way Through Jams," [http://www.tomtom.com/whytomtom/subject.php?subject=13] Accessed Mar. 26, 2012.
TomTom, "An Up-to-Date Map, Every Day," [http://www.tomtom.com/whytomtom/subject.php?subject=11] Accessed Mar. 26, 2012.
Wu, A. et al., "Location-Based Information Fusion for Mobile Navigation," UbiComp '11, Sep. 17-21, 2011.
Garmin, nuvi® 3790LMT, Part No. 010-00858-21 [https://buy.garmin.com/shop/shop.do?cID=134&pID=87930&ra=true] Accessed Mar. 27, 2012.

* cited by examiner

NAVIGATION ROUTE UPDATES

BACKGROUND

This application relates generally to navigation. More specifically, the disclosure provided herein relates to a providing navigation route updates.

Users sometimes use global positioning system ("GPS") devices to navigate to a destination point or other geographic location. Similarly, users sometimes use various mapping software to plan trips or routes, and/or in conjunction with GPS devices to navigate to or between various geographic locations. Because navigation using GPS devices and/or mapping software has become popular with consumers, GPS capabilities and/or mapping software applications are sometimes included in various consumer goods such as vehicles, smartphones, and/or other products.

Generally speaking, existing GPS devices and/or mapping software applications store detailed map data that represents roads, public transit routes, hiking trails, biking trails, or the like, as well as detailed geographic location information. The GPS devices and/or mapping software can use the map data to determine one or more routes between two or more geographic locations. When navigating, users or application settings can provide preferences with respect to how routes are calculated and/or presented to users.

In some instances, for example, GPS devices and/or mapping software may calculate multiple routes between geographic locations. A first route may be calculated based upon a shortest distance between the geographic locations. A second route may be calculated as a route expected to consume the least time to complete, even if longer than a shortest route. Other routes also can be calculated based upon other considerations such as, for example, routes that pass or encounter desired waypoints, routes that avoid toll roads, scenic routes, routes that rely primarily upon freeways or interstate highways, routes that avoid freeways or interstate highways, and/or routes based upon other preferences or considerations.

Some GPS devices and/or mapping software are configured to present and/or consider traffic information when generating routes for users. The traffic information may be based on historical traffic information along the route and/or may be obtained from traffic information providers at various time intervals. In either case, the traffic information may or may not be current and as a result, users often discover that traffic conditions provided by a GPS-enabled device or mapping software are not accurate representations of actual traffic conditions. Thus, routes generated by GPS devices and/or mapping software based upon traffic information may not be optimized for real traffic conditions. Additionally, other considerations relied upon when generating routes may be outdated and/or unreliable, while some reliable sources of such information may be unavailable to these devices or software and therefore may not be relied upon at all.

SUMMARY

The present disclosure is directed to providing navigation routes and navigation route updates. According to various embodiments of the concepts and technologies disclosed herein, a user device can include a navigation application. The navigation application can generate routes at the user device and/or communicate with a remote routing service to obtain directions or routes. The routing service can be configured to rely upon navigation data to generate or modify navigation routes. The generated and/or modified routes can be provided to the user device as route data that is interpretable by the user device to provide navigation directions to a user.

According to various embodiments, the navigation data relied upon by the routing service can be obtained from a number of sources. The sources can include, for example, the user device, a server computer that hosts the routing service, and/or various navigation data sources that can communicate with the routing service. The navigation data sources can include, for example, radio data networks, traffic data servers, emergency authority systems, highway or tollway authority systems, news sources, or other systems or sources. The navigation data sources also can include social networking and/or messaging services that can be mined for road- or traffic-related data. These data can be identified via explicit or implicit contents, as will be explained in more detail herein.

According to one aspect of the concepts and technologies disclosed herein, a method is disclosed. According to various embodiments, route data corresponding to a navigation route can be generated at a server computer executing a routing service. The route data can be transmitted to a user device. At the server computer, navigation data can be obtained from a navigation data source, and based upon the navigation data, a determination can be made if the navigation route is to be modified. If the navigation route is to be modified, a modified route can be generated, and updated route data corresponding to the modified route can be transmitted to the user device.

In some embodiments, the navigation data can be obtained from two or more navigation data sources. The navigation data sources can include the user device and a social networking service. The navigation data can include data indicating a location of the user device, a speed of movement of the user device, and a bearing of the user device. The navigation data also can include a social networking post. The social networking post can include a word or phrase identifying a traffic-related condition and a geographic location associated with the traffic-related condition. In some embodiments, the method also can include determining, based upon the navigation data, expected conditions corresponding to conditions expected to exist at a point of time in the future, and projecting route conditions based, at least partially, upon the navigation data and the expected conditions. Generating the modified route can include determining, based upon the expected conditions and the navigation data, a route for avoiding a traffic related condition that is expected to be encountered along the navigation route.

According to another aspect of the concepts and technologies disclosed herein, a system is disclosed. The system can include a processor configured to execute computer-executable instructions and a memory device. The memory device can store a routing service that, when executed by the processor, can cause the processor to perform a method. According to various embodiments, route data can be generated. The route data can correspond to a navigation route. The route data can be transmitted to a user device in communication with the system. Navigation data from two or more navigation data sources can be obtained and based upon the navigation data, the system can determine if the navigation route is to be modified. If the system determines that the navigation route is to be modified, the system can generate a modified route and transmit, to the user device, updated route data corresponding to the modified route.

In some embodiments, the two or more navigation data sources can include the user device and the memory device. The navigation data can include data indicating a location of the user device, a speed of movement of the user device, a bearing of the user device, and map data. In some embodiments, the two or more navigation data sources further can include a social networking service and the navigation data can further include a social networking post. The system can include a device configured to analyze the social networking post to search for a word identifying a traffic-related condition, and identify a geographic location associated with the traffic-related condition. In some embodiments, the routing service further includes computer-executable instructions that, when executed by the processor, cause the processor to perform the method further including determining, based upon the navigation data, expected conditions corresponding to conditions expected to exist at a point of time in the future, and projecting route conditions based, at least partially, upon the navigation data and the expected conditions.

According to yet another aspect, another method is disclosed. According to various embodiments, route data corresponding to a navigation route can be generated at a server computer and transmitted to a user device. At the server computer, navigation data can be obtained from a navigation data source. Based upon the navigation data, the server computer can determine expected conditions corresponding to conditions expected to exist at a point of time in the future and can project route conditions based, at least partially, upon the navigation data and the expected conditions. The server computer also can determine, based upon the navigation data and the route conditions, if the navigation route is to be modified. If the navigation route is to be modified, a modified route can be generated, and updated route data corresponding to the modified route can be transmitted to the user device.

In some embodiments, the navigation data can be obtained from two or more navigation data sources including the user device, the server computer, a social networking service, and a device associated with a road authority. The navigation data can include data indicating a location of the user device, a speed of movement of the user device, a bearing of the user device, map data, road capacity data, speed limit data, and traffic-related data obtained by analyzing a social networking post associated with the social networking service. In some embodiments, the traffic-related data can include information mined from a social networking post including a word that identifies a traffic-related condition, and data indicating a geographic location associated with the traffic-related condition.

In some embodiments, generating the modified route can include determining, based upon the expected conditions and the navigation data, a route for avoiding a traffic related condition that is expected to be encountered along the navigation route. The method also can include presenting, on a user interface for displaying a map display, a road incident indicator. The road incident indicator can be configured to respond to selection by causing the user device to present an indication of a type of road incident that exists, data indicating at least one of the two or more navigation data sources, an option to ignore the road incident indicator, and an option to generate the modified route to avoid the road incident.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to providing navigation routes and/or providing navigation route updates. According to various embodiments of the concepts and technologies disclosed herein, a user device can include a navigation application configured to obtain route data from a routing service. The routing service can be configured to rely upon navigation data locally stored and/or obtained from a number of sources to generate or update navigation routes. The generated and/or updated or modified routes can be provided to the user device as route data that is interpretable by the user device to provide navigation directions to a user.

According to various embodiments, the navigation data relied upon by the routing service can be obtained from the user device and/or a device that hosts the routing service. The navigation data also can be obtained from any number of navigation data sources that can communicate with the routing service. The navigation data sources can include systems or services operated by government or private entities such as highway authorities, emergency personnel, road authorities, news sources, or other sources such as social networking sources, traffic systems, or the like. The routing service can modify routes based upon the navigation data and can push, transmit, and/or otherwise provide route updates to the user device. In some embodiments, the user device can use the route updates to reroute users and/or to avoid various events or incidents along a navigation route. These and other aspects of the concepts and technologies disclosed herein will be illustrated and described in more detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
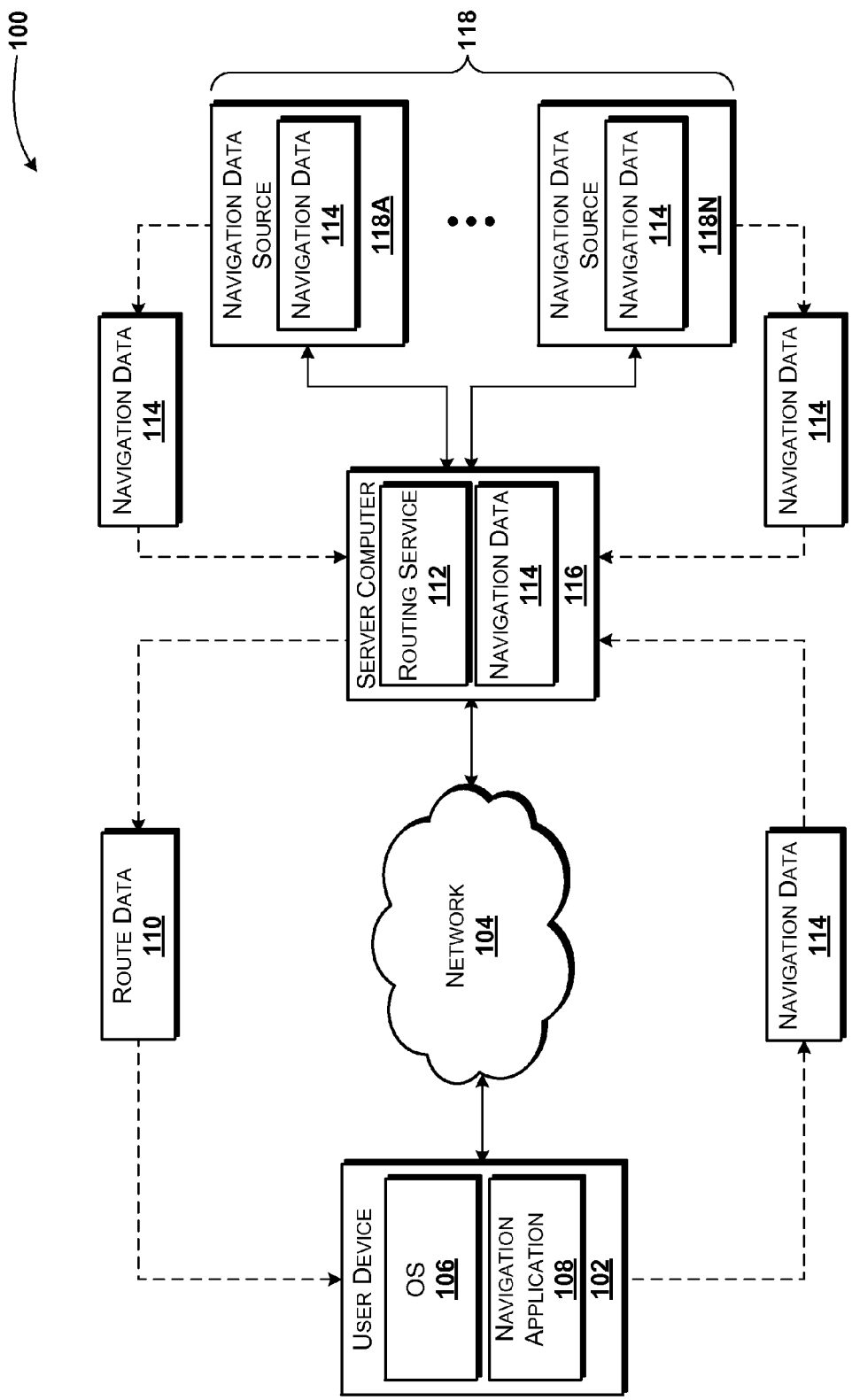
FIG. 1 is a system diagram illustrating an illustrative operating environment for the various embodiments disclosed herein.

Referring now to FIG. 1, aspects of an operating environment 100 for various embodiments of the concepts and technologies disclosed herein for providing navigation route updates will be described, according to an illustrative embodiment. The operating environment 100 shown in FIG. 1 includes a user device 102 operating in communication with a communications network ("network") 104. According to various embodiments, the functionality of the user device 102 may be provided by one or more mobile telephones, smart phones, laptop computers, tablet computers or slate devices, GPS devices, vehicle navigation systems, other computing systems, portable data assistants ("PDAs"), or the like. Furthermore, it should be understood that the functionality of the user device 102 can be provided by a single device, by two similar devices, and/or by two or more dissimilar devices. For purposes of describing the concepts and technologies disclosed herein, the user device 102 is described herein as a smart phone. It should be understood that this embodiment is illustrative, and should not be construed as being limiting in any way.

The user device 102 can execute an operating system 106 and one or more application programs such as, for example, a navigation application 108. The operating system 106 is a computer program for controlling the operation of the user device 102. The navigation application 108 is an executable program configured to execute on top of the operating system 106 to provide various functions described herein for providing navigation route updates. Although the navigation application 108 and the operating system 106 are illustrated as separate entities executed by the user device 102, it should be understood that in some embodiments, the functionality described herein with respect to the navigation application 108 and/or the operating system 106 can be provided by a single module. In other words, the navigation application 108 and/or the operating system 106 can both be included in an embedded computing system and need not be embodied as separate modules or applications.

The navigation application 108 can be configured to provide a user of the user device 102 with directions to navigate to a destination point or other geographic location ("geographic location") and/or between multiple geographic locations. Because the functionality of the navigation application 108 for navigating to or between geographic locations is generally understood, additional details of these functions are not described herein in additional detail. The navigation application 108 also can be configured to provide additional functionality as described herein for providing navigation route updates.

While not illustrated or described separately in FIG. 1, it should be understood that the user device 102 can include a location determination device for determining a geographic location of the user device 102. According to various embodiments, the user device 102 can include and/or can use a GPS receiver to determine its geographic location. Other technologies are possible and are contemplated. In particular, various implementations of the user device 102 can determine geographic location using GPS, Advanced GPS ("A-GPS"), and/or other global positioning technologies; triangulation, BLUETOOTH beacons, WIFI service set identification ("SSID") information, and/or other radio-based location technologies; and/or other location determination techniques and/or technologies. For purposes of describing the concepts and technologies disclosed herein, the illustrated embodiments are described as being performed by a user device 102 that includes a GPS receiver. In light of the above, it should be understood that this embodiment is illustrative, and should not be construed as being limiting in any way.

In particular, the navigation application 108 can be configured to obtain information defining a route ("route data") 110 from a routing service 112. The navigation application 108 also can be configured to provide navigation data 114 to the routing service 112 to modify the route and/or to generate the route defined by the route data 110. As will be explained in more detail below, the navigation application 108 also can be configured to submit or otherwise provide navigation data 114 to the routing service 112 for use in generating the route data 110. The functionality of the routing service 112 is set forth in additional detail below.

In some embodiments, the functionality of the routing service 112 is provided by a web application or other application program executing on a server computer 116. In some other embodiments, the functionality of the routing service 112 can be provided by the navigation application 108. As such, while the routing service 112 is illustrated herein as being executed by the server computer 116, it should be understood that this embodiment is illustrative, and should not be construed as being limiting in any way.

The routing service 112 can be configured to receive and respond to route requests or other queries (not shown), which can be generated by various devices in communication with the routing service 112 such as, for example, the user device 102. The routing service 112 can be configured to rely upon various types of data including, but not limited to, the navigation data 114 received from the user device 102. For example, the routing service 112 can receive various instances of navigation data 114 from various sources including, but not limited to, the user device 102 and/or the navigation data sources 118A-118N (hereinafter collectively and/or generically referred to as "navigation data sources 118"). The server computer 116 also can store the navigation data 114, for example, map data, points of interest data, and/or other information, which can be used by the routing service 112 to generate the route data 110 described above.

According to various implementations, the navigation data sources 118 can include, but are not limited to, servers or other computing devices in communication with the server computer 116. In the illustrated embodiment, the navigation data source 118A can correspond to a social networking server and/or a messaging server for hosting a social networking service and/or a messaging service, respectively. Examples of social networking services include, but are not limited to, the FACEBOOK social networking service, the LINKEDIN professional networking service, the MYSPACE social networking service, the FOURSQUARE geographic networking service, the YAMMER office colleague networking service, or the like. The messaging services can include commenting, blogging, and/or microblogging services. Some examples of messaging services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services and/or messaging services are not mentioned herein for the sake of brevity. As such, the above embodiments are illustrative, and should not be construed as being limited in any way.

Although not shown in FIG. 1, the operating environment 100 can include data mining applications and/or search engines configured to mine data from the navigation data sources 118. Thus, for example, in some embodiments wherein the data source 118A corresponds to a social networking service and/or a messaging service, a server or application can be configured to mine data from the navigation data source 118A and to use this data as the navigation data 114. For example, in one contemplated embodiment posts or messages are searched for traffic, construction, and/or other information relevant to navigation. Thus, for example, a message relating to or mentioning a "traffic jam" can be analyzed to determine if the message relates to information relevant to a traffic jam, whether the source is verified, and/or where the traffic jam is located. Thus, messages or posts hosted by or provided by the navigation data source 118A (and/or other navigation data sources 118) can be analyzed. In some embodiments, analysis of the messages or posts can include natural language analysis, explicit data analysis, and/or other analysis to identify traffic-related social networking posts, messages, comments, and/or other data. Additionally, the analysis can include operations for determining a location associated with the traffic-related social networking posts, messages, comments, and/or other data that can be used as the navigation data 114. Some illustrative embodiments for determining traffic-related social networking posts or the like are discussed in more detail below, particularly with reference to FIG. 3. This and other types of the navigation data 114 can be used by the routing service 112 to generate routes and/or to modify routes, as will be explained in more detail below.

The routing service 112 also can be configured to obtain the navigation data 114 from other navigation data sources 118 such as, for example, highway and/or road authority computer systems, department of transportation systems, radio traffic information systems or broadcasts, radio data networks ("RDNs"), traffic information sources, or the like. As such, the navigation data 114 provided by the navigation data sources 118 can include, for example, construction information, road closure information, road capacity information, speed limit information, or the like. Additionally, or alternatively, the navigation data sources 118 can include police, fire, and/or rescue service computing systems. Thus, the navigation data 114 can include, for example, accident information, emergency condition information, snow conditions, ice conditions, rain conditions, heat/cold conditions, or other emergency or road-related conditions that can be used by the routing service 112 to modify and/or generate routes. It should be understood that this embodiment is illustrative, and should not be construed as being limiting in any way.

As explained above, the user device 102 also can function as a navigation data source 118. Thus, for example, the user device 102 can provide information to the server computer 116 and/or the routing service 112 for use in generating and/or modifying the route data 110. In some embodiments, for example, the user device 102 can report its present location, bearing, speed, and/or position along a route to the routing service 112 as the navigation data 114. In another contemplated embodiment, the user device 102 can report data collected with various vehicle sensors and/or systems such as, for example, fraction control, rain sensors, light sensors, speedometers, or the like to identify road conditions to be avoided, or the like. The navigation data 114 reported by the user device 102 also can include, for example, road closure information, accident information, detour information, or the like. As will be explained in more detail below, the routing service 112 can be configured to consider the position, bearing, speed, and/or position along a route to generate and/or modify route data 110 for the user device 102 and/or other devices and/or users. Because these examples of the navigation data 114 are illustrative, it should be understood that these embodiments are illustrative, and should not be construed as being limiting in any way.

In light of the above description, it can be appreciated that various entities can operate as sources of the navigation data 114 including, but not limited to, the user device 102, the server computer 116, and/or the navigation data sources 118. Similarly, it can be appreciated that the routing service 112 can be configured to obtain and/or use navigation data 114 of various types that can be collected and/or otherwise obtained from various sources. The navigation data 114 therefore can include, but is not limited to, road and/or map data; user locations, speeds, bearings, and/or route positions; social networking data; messages, comments, blog posts, and/or microblogging posts; road condition data; traffic data; weather data and/or other environmental conditions information; speed limit and/or road capacity information; route position information; detour, construction, accident, or road closure information; other types of information or the like. The routing service 112 can be configured to generate the route data 110 based upon these and other types of navigation data 114 and/or to modify existing routes based upon these and/or other types of the navigation data 114.

According to embodiments, the user device 102 executes the navigation application 108. A user or other entity can request, via the navigation application 108, directions to a destination or other geographic location. In some embodiments, the navigation application 108 is configured to generate the requested directions, while in some other embodiments, the navigation application 108 can be configured to submit a request or query to the routing service 112 to obtain the directions.

The routing service 112 can store and/or otherwise obtain navigation data 114 from a number of sources including, but not limited to, the user device 102, the server computer 116, and/or navigation data sources 118. In some embodiments, the routing service 112 obtains the navigation data 114 from the user device 102 and/or the navigation data sources 118. In some other embodiments, the user device 102 and/or the navigation data sources 118 transmit the navigation data 114 to the routing service 112. The routing service 112 can be configured to determine a route to a geographic location, for example, a destination indicated in a request or query for the directions or routes. In determining the directions or route to the geographic location, the routing service 112 can consider the navigation data 114 obtained from the various sources.

The routing service 112 can be configured to consider the navigation data 114 and to determine expected, future, or prospective conditions ("expected conditions") based upon the navigation data 114. Thus, for example, the routing service 112 can determine, based upon the navigation data 114, current road conditions as well as future road conditions. Thus, for example, a user can request a route to a geographic location. During navigation to the geographic location, or at any other time, the routing service 112 can obtain the navigation data 114 and update the route between a current position and the geographic location.

In one contemplated embodiment, a user can navigate to a geographic location. At some point in time, the user can take a detour or reroute and this information can be provided to the routing service 112. Thus, if a future user or navigator encounters the detour or is rerouted for other reasons, the routing service 112 can consider not only current road conditions, but also expected conditions based upon the rerouting of previous navigators. These and other aspects of the routing service 112 will be described in more detail below.

The operating environment 100 is illustrated in FIG. 1 as including one user device 102, one network 104, one server computer 116, and two navigation data sources 118. It should be understood, however, that various implementations of the operating environment 100 include multiple user devices 102, multiple networks 104, multiple server computers 116, and/or two, fewer than two, and/or more than two navigation data sources 118. As such, the illustrated embodiment of the operating environment 100 should be understood as being illustrative, and should not be construed as being limiting in any way.

Figure 2:
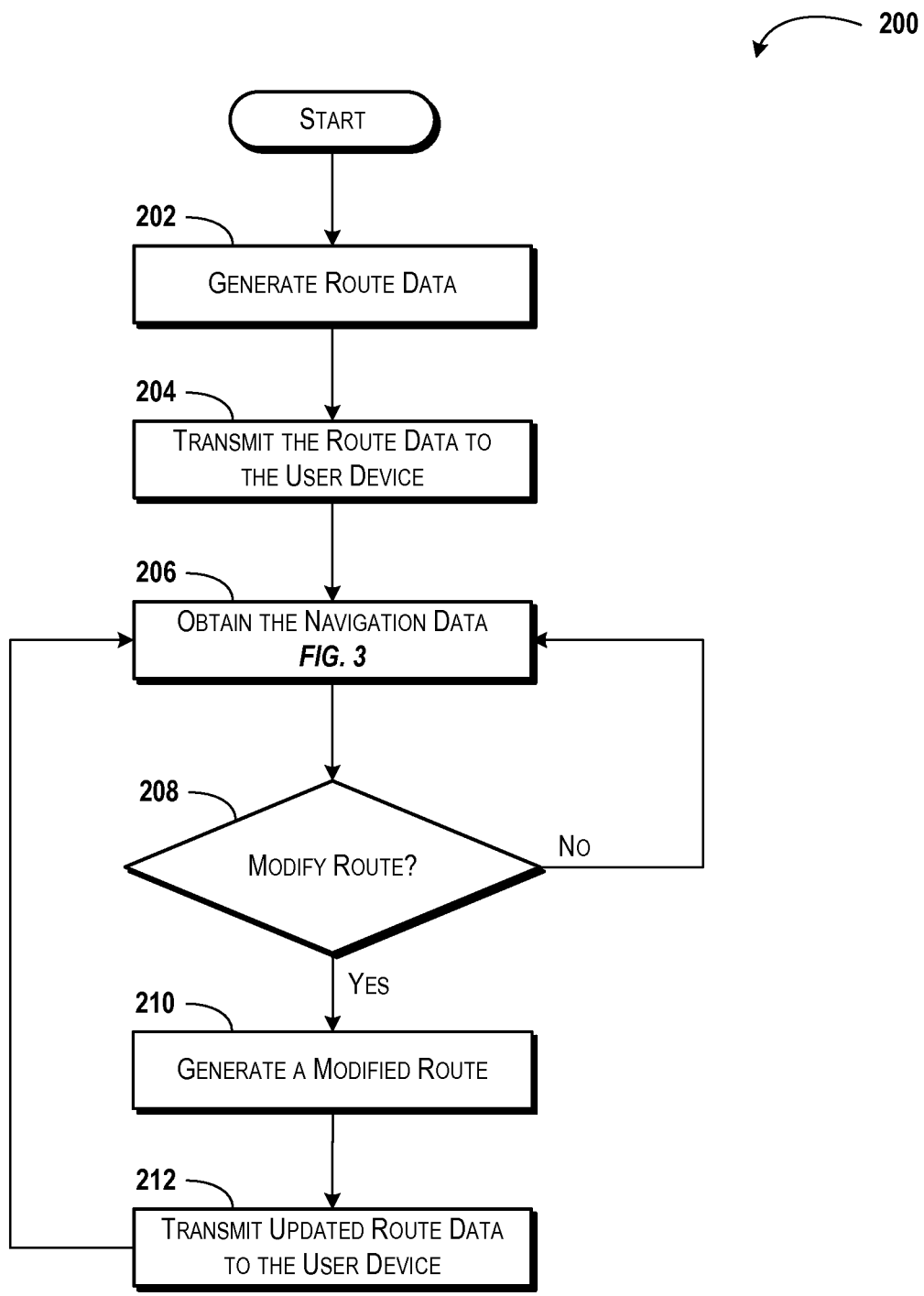
FIG. 2 is a flow diagram showing aspects of a method for providing navigation route updates, according to an illustrative embodiment.

Turning now to FIG. 2, aspects of a method 200 for providing navigation route updates will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the methods disclosed herein are described as being performed by the server computer 116 via execution of one or more software modules such as, for example, the routing service 112. It should be understood that additional and/or alternative devices and/or network nodes can provide the functionality described herein via execution of one or more modules, applications, and/or other software including, but not limited to, the routing service 112. Thus, the illustrated embodiments are illustrative, and should not be viewed as being limiting in any way.

The method 200 begins at operation 202, wherein the server computer 116 generates route data 110. As explained above with reference to FIG. 1, the server computer 116, or the routing service 112 executed thereby, can receive requests or queries for routes or directions to or between one or more destinations or other geographic locations, and can calculate a route to or between the geographic locations in response to the request. As generally is understood, the routing service 112 can calculate the routes between a current location and a destination or between two or more geographic locations based upon various variables and/or other considerations such as, for example, determining the shortest routes based upon available roads; determining the quickest routes based upon speed limits, traffic, or other considerations; determining the shortest or quickest routes based upon a preference to avoid two lane roads, freeways, toll roads, or the like; or based upon other considerations. It can be appreciated that speed limits, numbers of lanes, and/or the shortest or quickest road routes between locations can be relatively static. As such, changes to these considerations may occur over long periods of time such as after road construction projects, or the like.

According to various embodiments of the concepts and technologies disclosed herein, however, the routing service 112 also can be configured to calculate routes based upon fluid or dynamic considerations. These considerations can change quickly based upon various foreseen and/or unforeseen events including events that may occur during navigation. Thus, for example, an accident, road closure, traffic jam, or other occurrence may not be reflected in the route calculated in operation 202 and/or the route data 110 based thereon. The consideration of these and other dynamic considerations are discussed below in more detail below, particularly with reference to operations 206-208 and FIG. 3.

From operation 202, the method 200 proceeds to operation 204, wherein the server computer 116 transmits the route data 110 to the user device 102. As explained above the route data 110 can be based upon a route calculated by the routing service 112 and can be based upon available roads and various user preferences. Thus, the route data 110 can be provided to the user device 102 as a response to a query or request for directions to a particular geographic location and/or for directions between two or more geographic locations.

From operation 204, the method 200 proceeds to operation 206, wherein the server computer 116 obtains the navigation data 114 from one or more sources. Obtaining the navigation data 114 is described in additional detail below with reference to FIG. 3. For purposes of describing the method 200, it should be understood that obtaining the navigation data 114 in operation 206 can occur at any time, including immediately after providing the route data 110 to the user device 102. According to various embodiments of the concepts and technologies disclosed herein, the functionality of operations 206-208 can be performed according to a schedule such as, for example, every ten seconds, every minute, every five minutes, every ten minutes, or other time periods. The above time periods are merely illustrative of some contemplated embodiments and should not be construed as being limiting in any way.

Additionally, or alternatively, the functionality of operations 206-208 can be performed on-demand, for example, if a user at the user device 102 requests an update or selects an option to access this functionality. In one contemplated embodiment, a user selects a "detour" option at the user device 102 and in response thereto, the routing service 112 obtains the navigation data 114. In another contemplated embodiment, the routing service 112 obtains an update from one or more of the navigation data sources 118. In response to this update, the routing service 112 can identify any active routes that may be affected by the updated navigation data 114. Because the functionality described herein for obtaining and analyzing the navigation data 114 can be performed in response to various considerations, it should be understood that that these examples are illustrative and should not be construed as being limiting in any way.

From operation 206, the method 200 proceeds to operation 208, wherein the server computer 116 determines, based upon the navigation data 114 obtained in operation 206, if the route corresponding to the route data 110 is to be modified. According to various embodiments, the server computer 116 can analyze the navigation data 114 obtained in operation 206 and determine if the route upon which the route data 110 is based is affected by any of the navigation data 114. For example, the route data 110 can correspond to a route between PointA and PointB. In this example, the route includes two miles along main street. If, for example, the navigation data 114 obtained in operation 206 indicates that main street is closed at some point between PointA and PointB, the server computer 116 may determine that the route is to be changed to avoid the point at which main street is closed. As mentioned above, obtaining the navigation data 114 is described in more detail below with reference to FIG. 3. As such, the functionality of the server computer 116 for determining if the route is to be modified will be better understood with reference to the types and sources of the navigation data 114 as described above and as will be illustrated and described in more detail below with reference to FIG. 3.

If the server computer 116 determines, based upon the navigation data 114, that the route is not to be modified, the method 200 can return to operation 206. The server computer 116 can again obtain the navigation data 114 at some point in time, either immediately, upon expiration of some time period, and/or on-demand as explained above. Thus, execution of the method 200 can repeat or pause at operation 208 until the server computer 116 determines, in any iteration of operation 208, that the route is to be modified.

If the server computer 116 determines, based upon the navigation data 114, that the route is to be modified, the method 200 proceeds to operation 210. In operation 210, the server computer 116 generates a modified route. The modified route can be calculated based upon the navigation data 114 obtained in operation 206 and/or other information, as is descried in more detail below with reference to FIG. 3. The modified route can avoid, for example, a specific geographic location, a particular road, an area, a town or city, a construction project, an accident or other emergency event, a traffic jam, or other point or area. Additionally, as will be more clearly understood with reference to FIG. 3, the server computer 116 can determine or obtain expected conditions along roads or routes.

As such, in determining a modified route, the server computer 116 can consider not only existing conditions and existing roads, but also expected conditions and existing roads. For example, if a first user of the routing service 112 is rerouted off of main street in the example above and onto first street, a subsequent user who is rerouted off of main street may or may not be routed onto first street and/or may be routed in a different direction along first street relative to the first user. In determining how to reroute a second or other subsequent user, the server computer 116 can consider not only existing conditions, but expected conditions including previous reroutes of other users. An example of rerouting two users in different directions on a same street is illustrated and described below with reference to FIGS. 4F-4G. Because the modified routes can be determined based upon these and/or other considerations, it should be understood that this embodiment is illustrative, and should not be construed as being limiting in any way.

From operation 210, the method 200 proceeds to operation 212, wherein the server computer 116 transmits updated route data 110 to the user device 102. Thus, although not shown in FIG. 2, the server computer 116 can determine, based upon the modified route generated in operation 210, route data 110 corresponding to the modified route and can transmit the updated route data 110 to the user device 102. From operation 212, the method 200 can return to operation 206 and the server computer 116 can again obtain the navigation data 114 as explained above.

Although not illustrated in FIG. 2, the server computer 116 can be configured to trigger alerts, alarms, banners, badges, and/or other UI elements or events at the user device 102 to inform the user that the modified route has been generated. The server computer 116 also can be configured to push route updates to the user device 102 such that the navigation application 108 can use or present the modified route. In some embodiments, as will be illustrated and described below in more detail with reference to FIGS. 4A-4G, the user device 102 can present route change indicators to inform users of route changes. In some embodiments, the route change indicators may inform a user to make a "u-turn," to turn left, right, or around, and/or to take other actions to implement the modified route. Because other actions and/or indicators are contemplated for informing a user that a route has changed, it should be understood that these embodiments are illustrative, and should not be construed as being limiting in any way.

Figure 3:
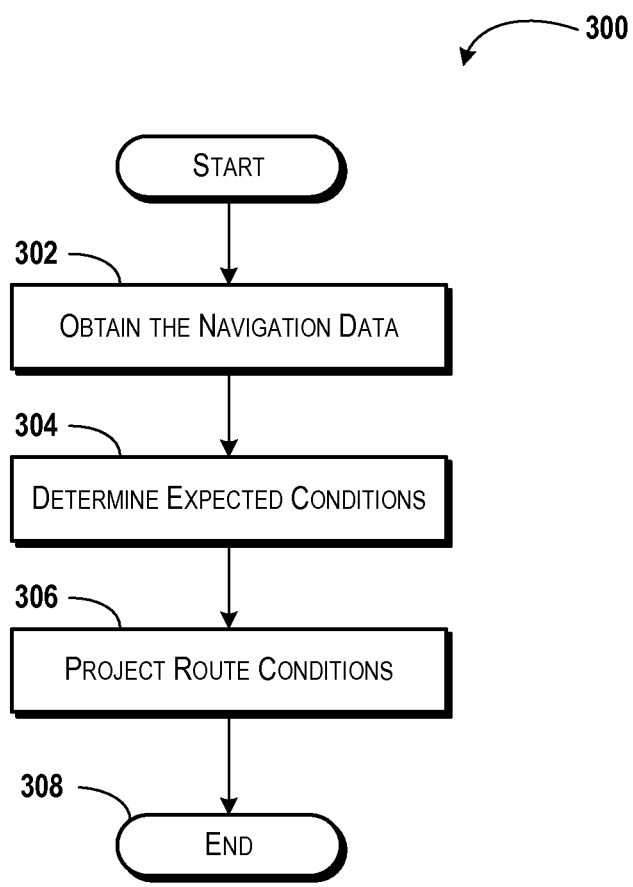
FIG. 3 is a flow diagram showing aspects of a method for obtaining navigation data, according to another illustrative embodiment.

Turning now to FIG. 3, aspects of a method 300 for obtaining the navigation data 114 will be described in detail, according to an illustrative embodiment. It should be understood that the functionality described herein with respect to the method 300 can be, but is not necessarily, performed by the server computer 116 at operation 206 of the method 200 described above with reference to FIG. 2. Because the method 300 can be performed at other times, it should be understood that this embodiment is illustrative, and should not be construed as being limiting in any way.

The method 300 begins at operation 302, wherein the server computer 116 obtains the navigation data 114 from various sources. As described above, the server computer 116 can store navigation data 114 such as map data, points of interest, and/or other information. As such, the server computer 116 can obtain the navigation data 114 by retrieving the navigation data 114 from a local or remote data storage device such as, for example, a mass storage device, a memory, a datastore, a server, or the like.

Additionally, or alternatively, the server computer 116 can receive, retrieve, or otherwise obtain navigation data 114 from remote devices, nodes, or services. For example, the server computer 116 can receive navigation data 114 from the user device 102. The navigation data 114 provided by the user device 102 can include, for example, a current or recent location determined by and/or otherwise associated with the user device 102; a current or recent bearing and/or speed determined by and/or otherwise associated with the user device 102; a point along a route determined by the user device 102; and/or other information that can indicate a position, bearing, speed, and/or progression along a route.

The server computer 116 also can receive the navigation data 114 from one or more of the navigation data sources 118. As explained above, the navigation data sources 118 can be systems configured to provide the navigation data 114 such as, for example, traffic data servers or the like. In some embodiments, cellular providers can determine vehicle traffic based upon cellular signals in a particular area and can provide this information to the server computer 116 as the navigation data 114. Additionally, or alternatively, emergency entities such as police, fire department, rescue services, highway motorist assistance crews, or the like can provide the navigation data 114, wherein the navigation data 114 can include data indicating accidents, fires, emergency events, or the like. These providers may provide the navigation data 114 in an attempt to reduce traffic around the emergency location to ease access for emergency personnel, to comply with terms of one or more agreements between the providers and an entity associated with the routing service 112, for advertising and/or marketing purposes, and/or based upon other considerations, for example.

Additionally, the navigation data sources 118 can include computing systems associated with departments of transportation ("DOTs"), departments of motor vehicles ("DMVs"), or the like. Thus, the navigation data 114 can include information relating to past, current, or future road construction projects; road capacity information; speed limit information; historical and/or current traffic information; and other information.

The server computer 116 also can receive the navigation data 114 from navigation data sources 118 that are not configured to provide the navigation data 114. Rather, the server computer 116 can obtain the navigation data 114 from these navigation data sources 118 via data mining operations conducted by the navigation data sources 118, by the server computer 116, by search engines, by the routing service 112, and/or by other entities, nodes, or devices. In one contemplated example, a navigation data source 118 can include a social networking or messaging service that can be data mined to identify and use traffic-related posts and messages. In some embodiments, for example, a device can be configured to mine posts or messages to identify messages or posts that include particular words or phrases that may indicate traffic conditions. The words or phrases that are searched for can be updated at any time and can be based upon local or global word usage. Some examples of such words and phrases can include, but are not limited to, "gridlock," "traffic jam," "bottleneck," "roadblock," "no traffic," "smooth sailing," "making great time," "parking lot," "blockage," "congestion," "logjam," "rush hour," "traffic congestion," or the like. Because lists of words and phrases can be updated or changed at any time, it should be understood that these example words and phrases are illustrative, and should not be construed as being limiting in any way.

When messages or posts are identified as indicating traffic conditions, a location associated with the messages or posts can be determined. In some embodiments, the location can be determined based upon natural language analysis of words or phrases in the messages or posts. For example, a social networking post or message may include the text "traffic jam at main street and first street in Akron." Thus, navigation data 114 can be generated and/or obtained for indicating that a traffic jam exists at main street and first street in Akron. In some instances, a city or area may be listed that exists in multiple states, counties, or cities. Thus, additional analysis may be performed to determine, based upon mentioned streets or the like, where the traffic jam exists, in this case, Akron, Ohio. It should be understood that this embodiment is illustrative, and should not be construed as being limiting in any way.

In some other embodiments, social networking posts or messages may include explicit location data that may be provided by a user and/or a device used to submit the message or post. As such, a post may read "Sitting in a horrible traffic jam," but may not explicitly mention a particular location. The post or message may be tagged, however, with coordinates for a particular location. For example, a tag may be included in the post or message that specifies coordinates of 35.764613° North, 80.085996° West. Thus, navigation data 114 can be obtained or generated for indicating that a traffic jam exists at the specified location. Other contemplated methods for determining location of posts or messages can include IP addresses, WIFI SSIDs, BLUETOOTH beacons, establishment names such as restaurants or businesses, building names, landmarks, or the like. Because other approaches for determining location based upon explicit or implicit data are contemplated, it should be understood that these embodiments are illustrative, and should not be construed as being limiting in any way.

From operation 302, the method 300 proceeds to operation 304, wherein the server computer 116 can determine expected conditions based, at least partially, upon the navigation data 114. It can be appreciated from the above description of the navigation data 114 that current road conditions can be determined based upon various types of the navigation data 114. Additionally, future or expected conditions can be determined based upon the navigation data 114. For example, if a traffic jam or other road closure is determined to exist at a particular location, the server computer 116 can be configured to reroute users around the traffic jam, as explained above with reference to FIG. 2. Because the rerouted users may affect road conditions on surrounding roads, the server computer 116 can be configured to consider anticipated effects on the surrounding roads at some future time.

Thus, for example, the server computer 116 may determine, based upon known speed limits, traffic lights, traffic, and road capacity information, that rerouting a certain number of users along a particular street may cause additional traffic delays. This determination can be based upon expected conditions in view of numbers of users, known road capacity, known speed limits, known traffic, known traffic lights, and the like. Thus, instead of reacting to existing conditions only, the server computer 116 and/or the routing service 112 executed thereby can be configured to consider future or expected conditions when determining routes or modified routes.

From operation 304, the method 300 proceeds to operation 306, wherein the server computer 116 can project route conditions based upon the navigation data 114 and the expected conditions. Thus, as explained above, the server computer 116 can project route conditions along one or more routes based upon the various navigation data 114 obtained in operation 304. In some embodiments, multiple routes and projected route conditions can be determined by the server computer 116 and these projected route conditions can be considered when rerouting users. As such, the server computer 116 can provide a route that is optimized not only based upon user preferences and/or existing conditions, but also upon expected conditions and/or projected route conditions. From operation 306, the method 300 proceeds to operation 308. The method 300 ends at operation 308, and execution of the method 200 can resume as described above at operation 208.

Figure 4A:
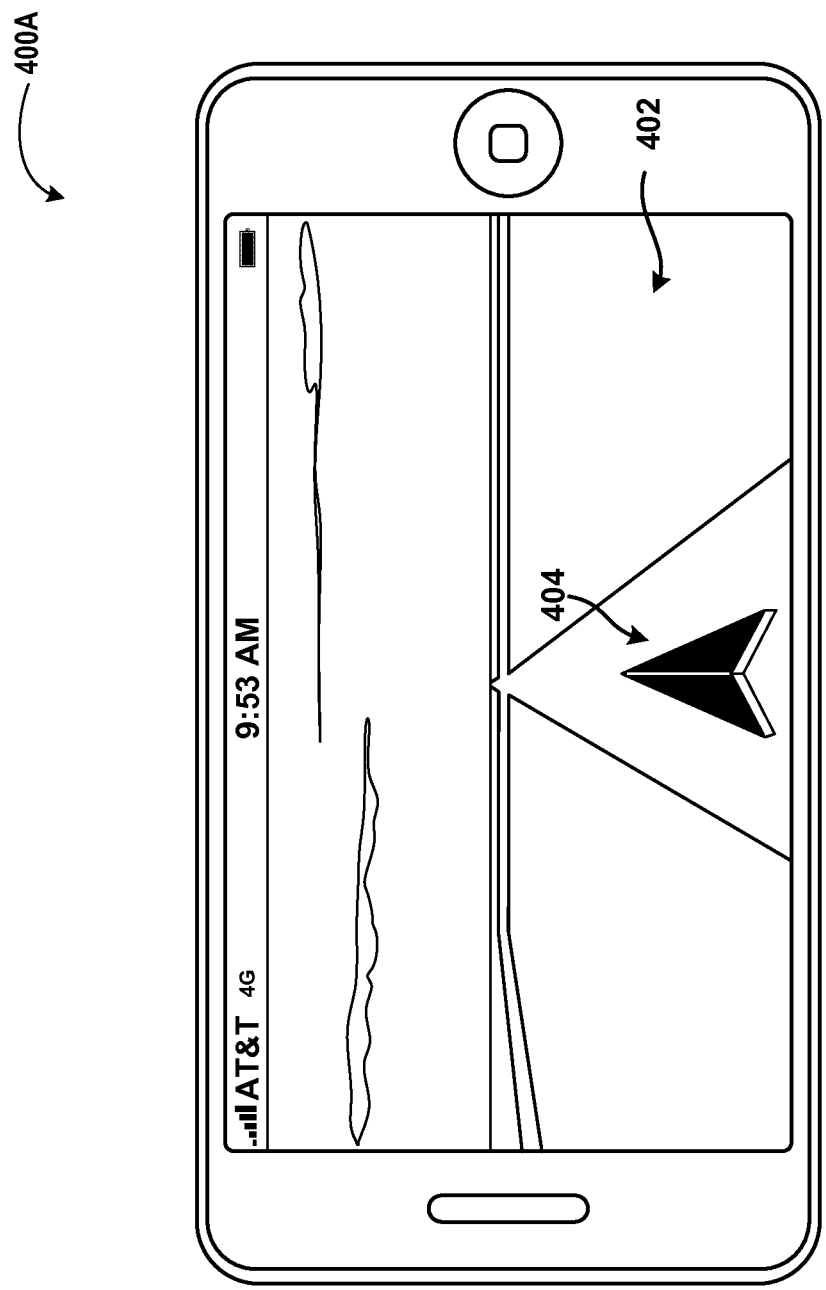
FIGS. 4A-4G are user interface ("UI") diagrams showing aspects of UIs for providing navigation route updates, according to some illustrative embodiments.

Turning now to FIGS. 4A-4G, UI diagrams showing various aspects of the concepts and technologies disclosed herein for providing navigation route updates will be described according to various illustrative embodiments. FIG. 4A shows an illustrative screen display 400A generated by a device such as the user device 102. It should be appreciated that the UI diagram illustrated in FIG. 4A is illustrative of one contemplated embodiment, and therefore should not be construed as being limiting in any way.

Although not shown in FIG. 4A, the screen display 400A can include various menus and/or menu options. The screen display 400A also can include a map display 402 for displaying directions or routes to and/or between various geographic locations. As shown in FIG. 4A, the screen display 400A can include a user indicator icon 404 for showing a current location of a user on a map presented in the map display 402. As is generally understood, the map display 402 and the user indicator icon 404 can be used to provide navigation instructions for a user based upon the location of the user. According to various implementations of the concepts and technologies disclosed herein, the location of the user device 102 and/or the relative location of the user indicator icon 404 with respect to the map display 402 can be determined using a GPS receiver, A-GPS technologies, triangulation, and/or other location determination technologies. In the illustrated embodiment, the user device 102 uses a GPS receiver to determine its location.

Figure 4B:
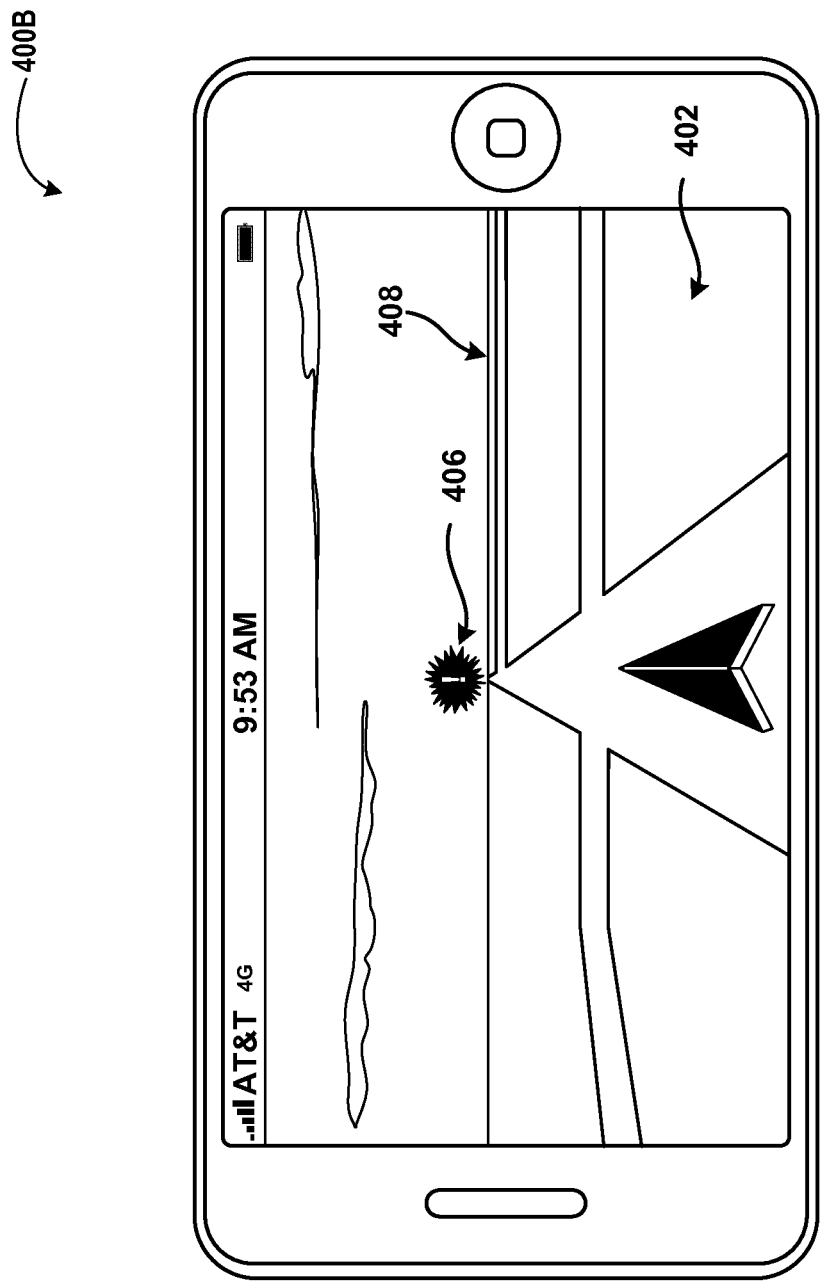

Referring now to FIG. 4B, a UI diagram showing additional aspects of the concepts and technologies disclosed herein for providing navigation route updates are described in detail. In particular, FIG. 4B shows a screen display 400B generated by a device such as the user device 102. In some embodiments, the screen display 400B can be generated by the user device 102 in response to detecting movement of the user device 102 along a route. It should be understood that this embodiment is illustrative, and should not be construed as being limiting in any way.

As shown in FIG. 4B, the user device 102 can be configured to display a road incident indicator 406 in the screen display 400B. The road incident indicator 406 can be used to show an approximate location of a road incident or information associated with a particular location on the map displayed in the map display 402. A road incident can include, for example, road construction, a traffic jam, a road closure, an accident, a dead end, or the like. Although not shown in FIG. 4B, it should be understood that the existence of the road incident, and the location thereof, can be determined by the routing service 112 in response to obtained navigation data 114, as explained in detail above with reference to FIGS. 2-3.

In the illustrated embodiment, the road incident indicator 406 is illustrated above the horizon 408 illustrated in the map display 402. As such, the road incident indicated by the road incident indicator 406 can exist outside of the viewable portion of the map shown in the map display 402. In some embodiments, the road incident indicator 406 can be displayed when the road incident associated with the road incident indicator is within a particular time or distance. In some embodiments, for example, the road incident indicator 406 is displayed approximately thirty minutes, ten minutes, five minutes, one minute, thirty seconds, or other times before the location of the road incident is expected to be encountered. In other embodiments, the road incident indicator 406 is displayed when the location associated with the road incident is ten miles away, five miles away, one mile away, or other distances away from a current location of the user device 102. Because these times or distances can be varied by user and/or software settings, it should be understood that these embodiments are illustrative, and should not be construed as being limiting in any way.

Figure 4C:
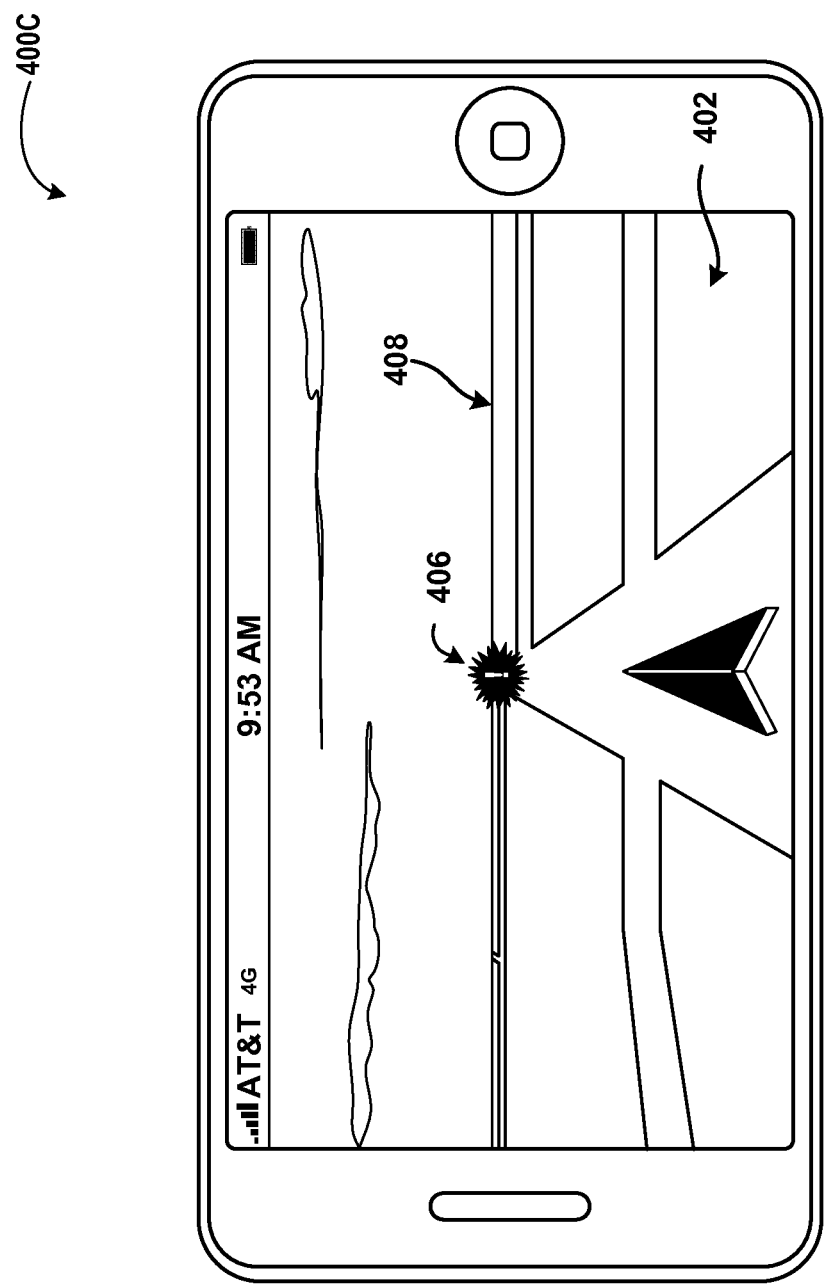

As the user device 102 is moved toward the road incident, the road incident indicator 406 eventually can be moved from above the horizon 408 and onto the viewable portion of the map display 402. An example of this is shown in FIG. 4C. As shown in FIG. 4C, the road incident indicator 406 has moved into a viewable portion of the map. Although not shown in FIGS. 4A-4C, it should be understood that that a user can click, tap, or otherwise select the road incident indicator 406 to access information relating to the road incident. An example of this is shown in FIG. 4D, which is described immediately below.

Figure 4D:
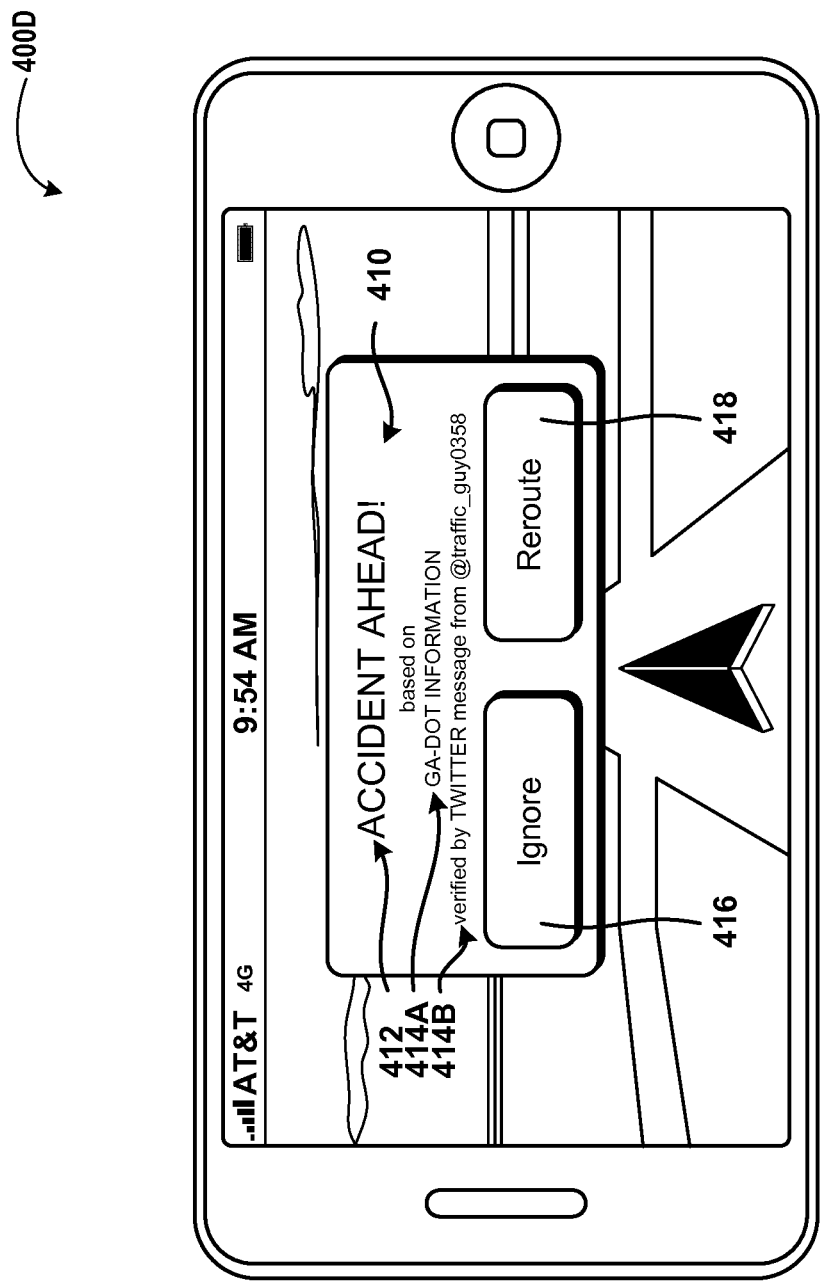

Referring now to FIG. 4D, a UI diagram showing additional aspects of the concepts and technologies disclosed herein for providing navigation route updates are described in detail. In particular, FIG. 4D shows a screen display 400D generated by a device such as the user device 102. The screen display 400D can be, but is not necessarily, displayed by the user device 102 in response to a user selecting the road incident indicator 406 illustrated and described above with reference to FIGS. 4B-4C. Because the screen display 400D can be displayed at other times, it should be understood that this embodiment is illustrative, and should not be construed as being limiting in any way.

As shown in FIG. 4D, the user device 102 can be configured to display a road incident information display 410 or other user interface display or item for providing information relating to the road incident indicated by the road incident indicator 406. The road incident information display 410 can include, for example, an indication 412 of a type of road incident that exists. In the illustrated embodiment, the road incident is an accident. It should be understood that this embodiment is illustrative, and should not be construed as being limiting in any way.

The road incident information display 410 also can include one or more source indicators 414A-B (hereinafter collectively and/or generically referred to as "source indicators 414") for indicating a source of the information used to determine that a road incident exists. In the illustrated embodiment, the source indicator 414A indicates that the information was obtained from the Georgia Department of Transportation ("GA-DOT") and the source indicator 414B indicates that the information was verified by a TWITTER message submitted by a user named "@traffic_guy0358." In some embodiments, the source indicators 414 can be included to allow users to evaluate the reliability of the information, to allow users to determine if the information has been verified (as shown in FIG. 4D), and/or for other purposes. Of course, the source indicators 414 can be omitted in some embodiments. Because no sources may be listed and/or more than two sources may be listed, it should be understood that this embodiment is illustrative, and should not be construed as being limiting in any way.

Figure 4E:
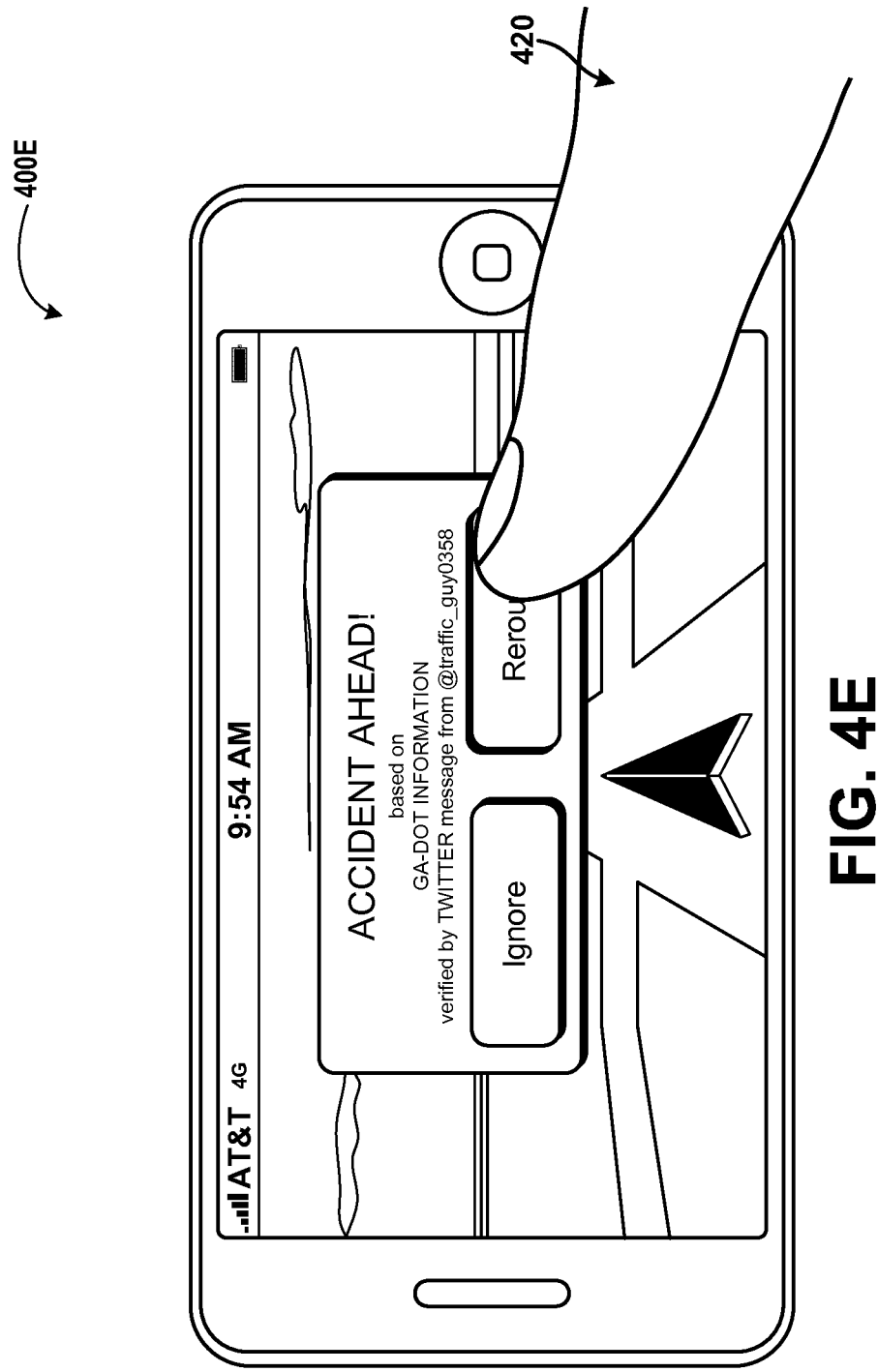

As shown in FIG. 4D, the road incident information display 410 also can include one or more UI controls 416, 418 for taking various actions with respect to the road incident. In the illustrated embodiment, the UI control 416 corresponds to an option for ignoring the road incident and the UI control 418 corresponds to an option for rerouting in response to the road incident. Selection of the UI control 416 can cause the user device 102 to close the road incident information display 410 and/or to take other actions. Selection of the UI control 418 can cause the user device 102 to generate or request generation of a new route that avoids the road incident associated with the road incident information display 410. Selection of the UI control 418 with a user's finger 420 is shown in FIG. 4E. It should be understood that this embodiment is illustrative, and should not be construed as being limiting in any way.

Figure 4F:
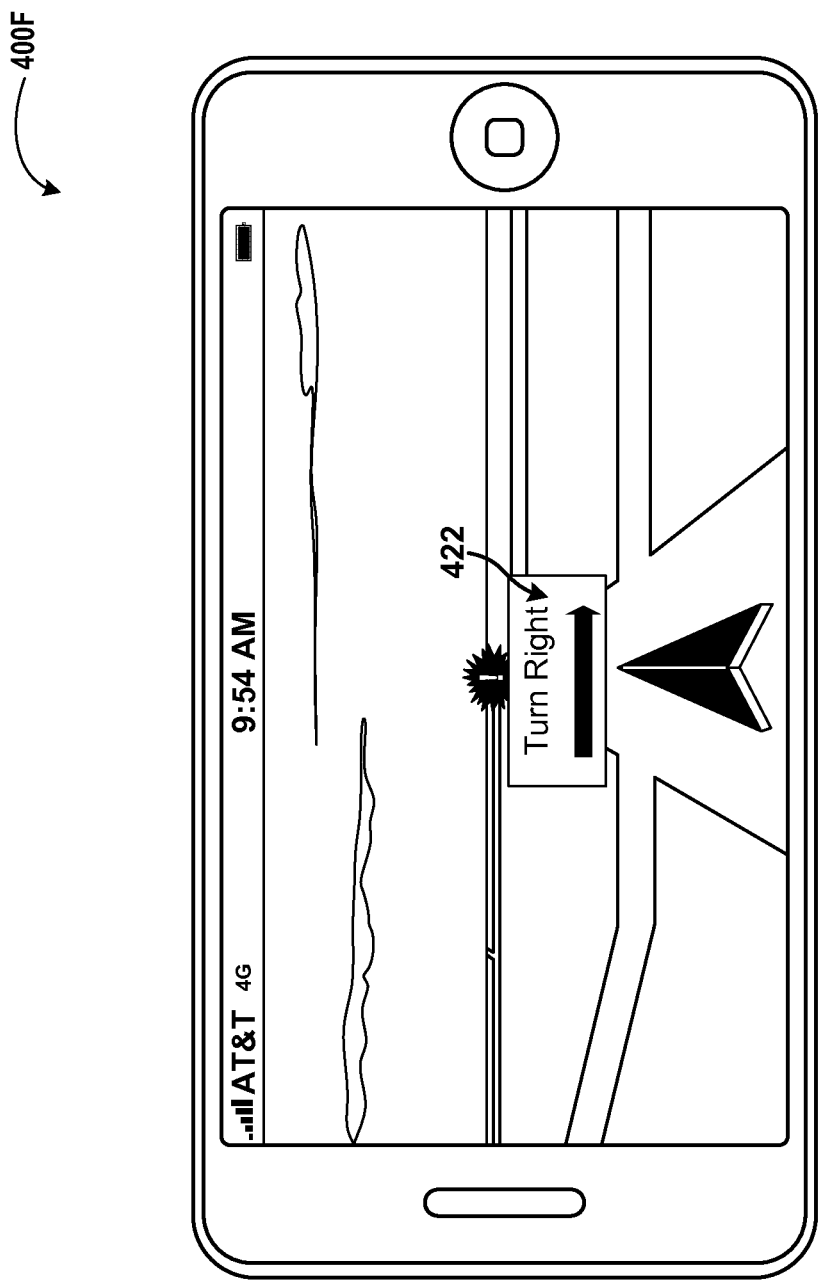

In FIG. 4F, an embodiment of providing a navigation route update is illustrated, according to an illustrative embodiment. In FIG. 4F, the user device 102 shows a route change indicator 422. The route change indicator 422 can be provided to inform a user of the user device 102 of a turn or other action to be taken to avoid the road incident. In the illustrated embodiment, the route change indicator 422 instructs a user to turn right to avoid the road incident. In other embodiments, the route change indicator 422 may instruct a user to turn around, to turn left, or to take other actions. As such, the illustrated embodiment should be understood as being illustrative and should not be construed as being limiting in any way.

Figure 4G:
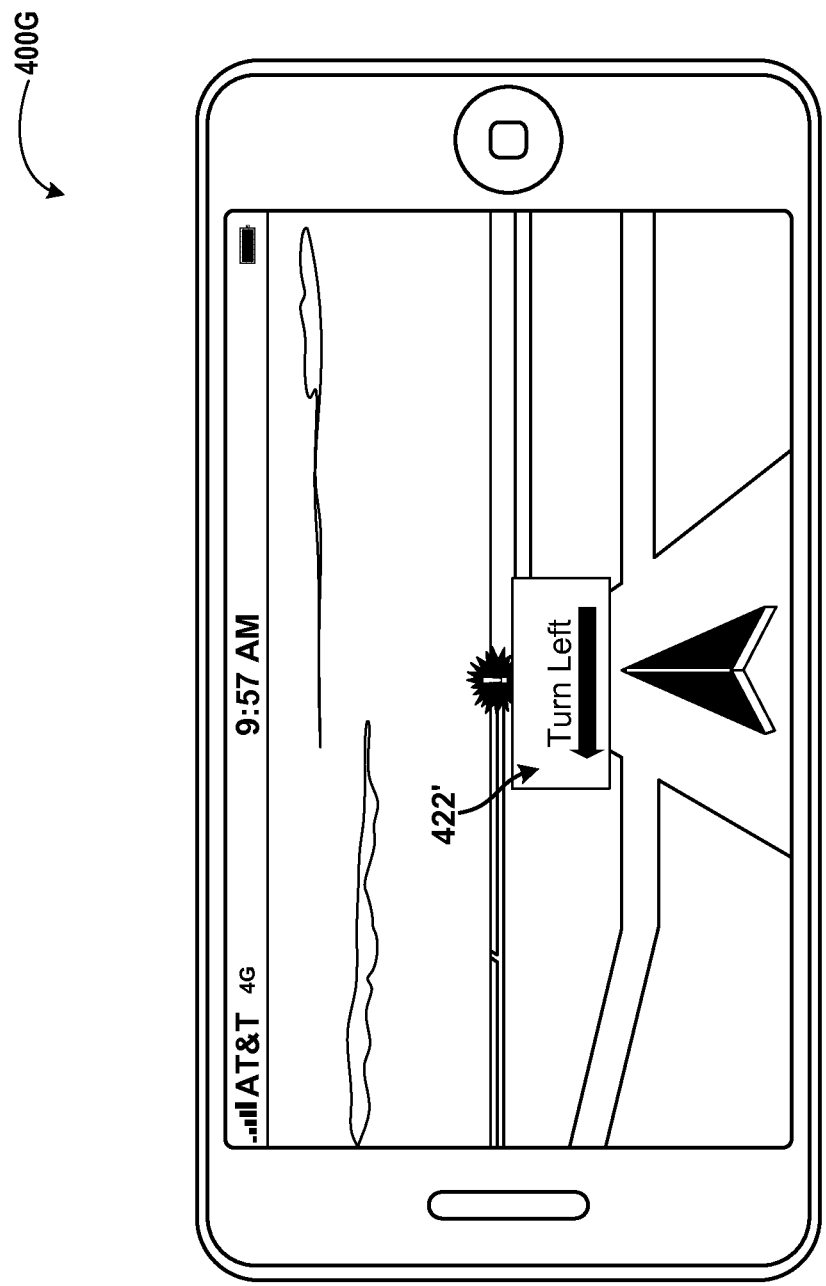

In FIG. 4G, another embodiment of providing a navigation route update is illustrated, according to another illustrative embodiment. In FIG. 4G, the user device 102 shows another route change indicator 422'. The screen display 400G can be, but is not necessarily, displayed by a device such as the user device 102 in response to a user selecting the UI control 418 to reroute around the road incident illustrated and described above. Because the screen display 400G can be displayed at other times, it should be understood that this embodiment is illustrative, and should not be construed as being limiting in any way.

The route change indicator 422' is similar to the route change indicator 422 illustrated in FIG. 4F, but instead of instructing a user to turn right, the route change indicator 422' instructs a user to turn left. Thus, FIG. 4G illustrates an embodiment in which one rerouted user can be instructed to turn right via the route change indicator 422 illustrated in FIG. 4F and another user can be instructed to turn left via the route change indicator 422'. The embodiments illustrated in FIGS. 4F-4G therefore can illustrate embodiments in which the routing service 112 considers routes provided to rerouted users when determining how to reroute another user. It should be understood that these embodiments are illustrative, and should not be construed as being limiting in any way.

Figure 5:
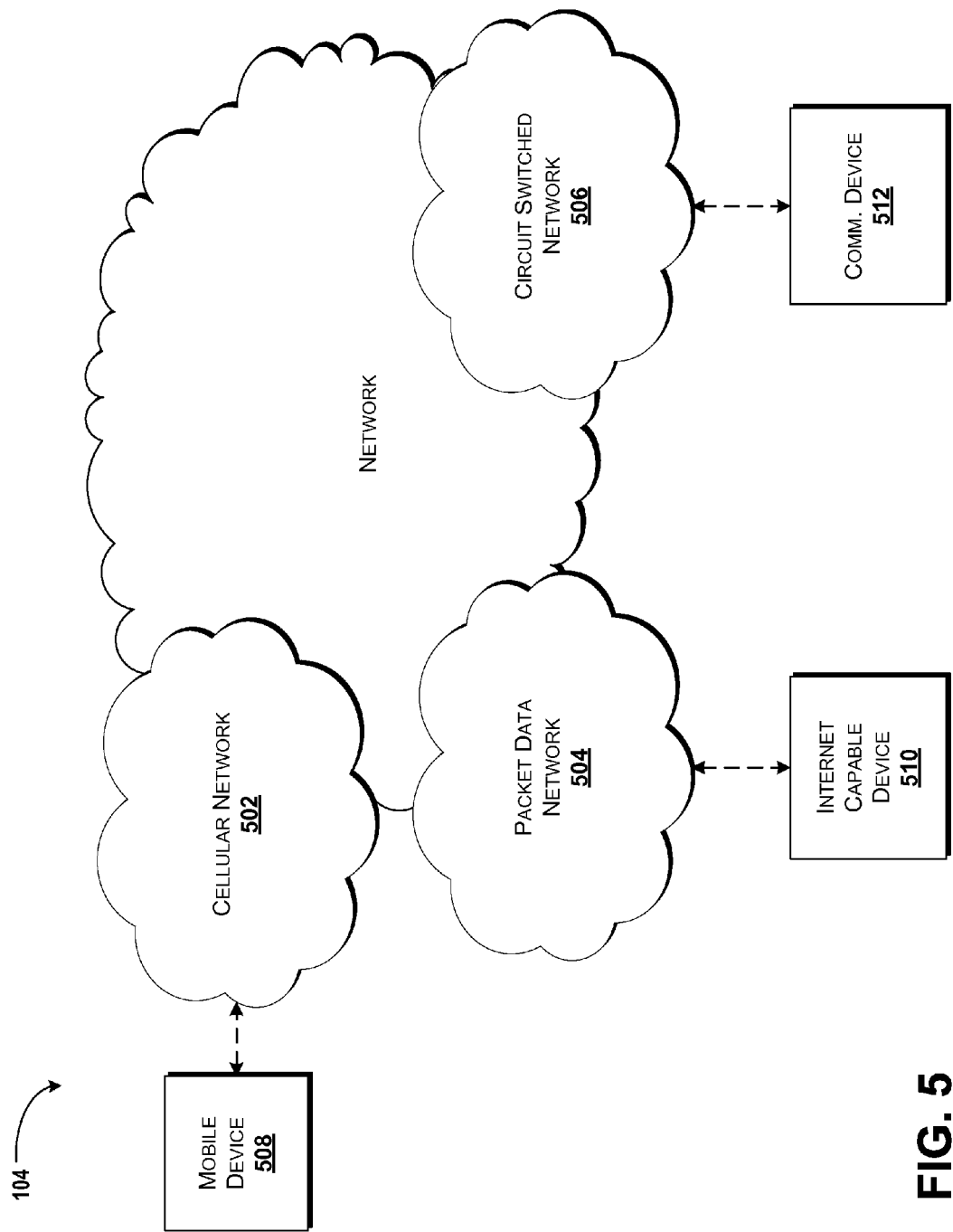
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device ("mobile device") 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

According to various implementations of the concepts and technologies disclosed herein, the functionality of the user device 102 can be provided by the mobile device 508, and the functionality of the routing service 112 can be provided by a one or more or a combination of the mobile device 508, the Internet capable device 510, and/or the communication device 512. As such, it should be understood that the user device 102 and the routing service 112 can interact with one another and/or the server computer 116 via any number and/or or combination of devices and networks.

Figure 6:
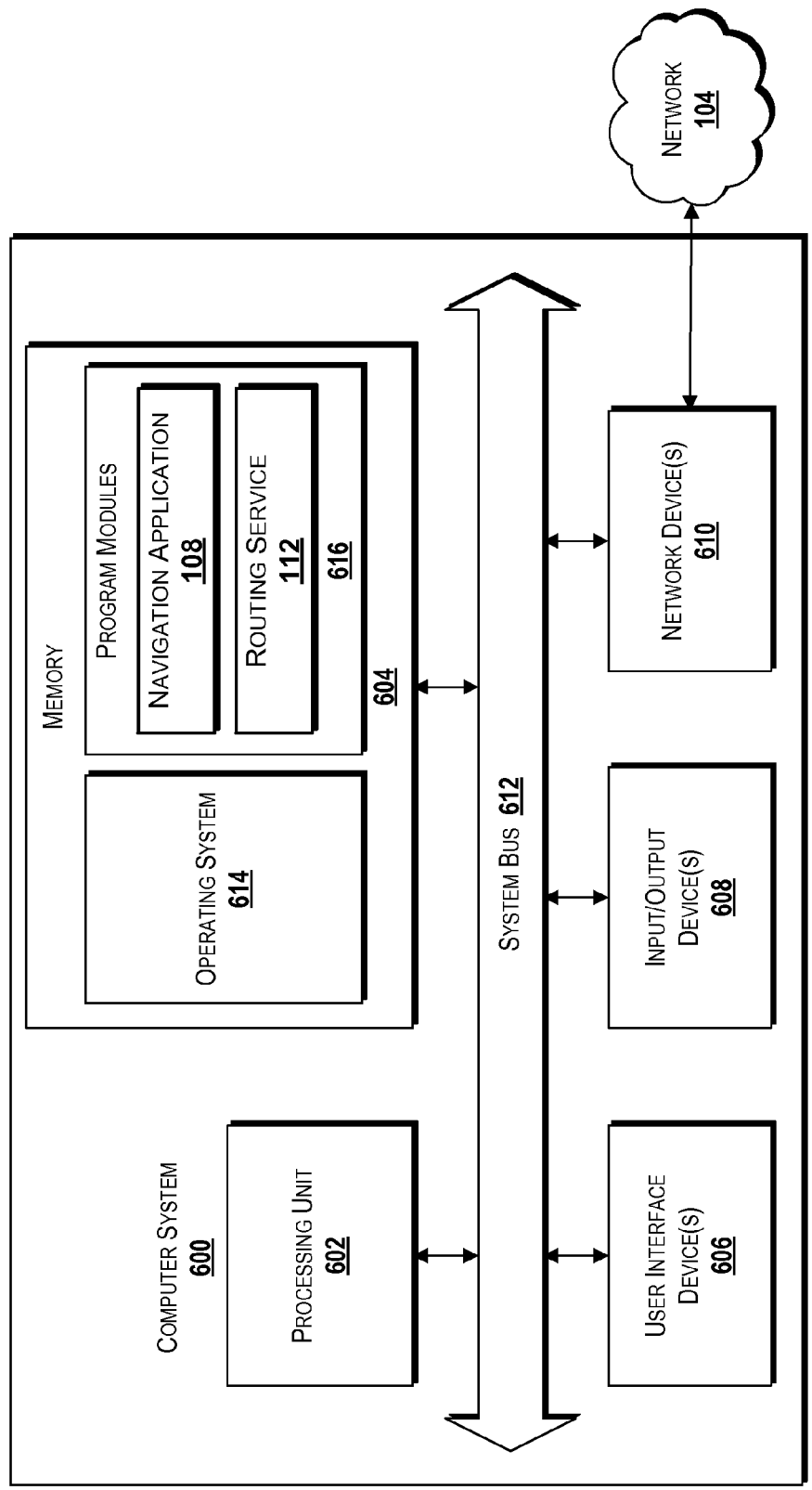
FIG. 6 is a block diagram illustrating an example computer system configured to provide navigation route updates, according to some illustrative embodiments.

FIG. 6 is a block diagram illustrating a computer system 600 configured to provide the functionality described herein for a verification service, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the navigation application 108 and/or the routing service 112. These and/or other programs can be embodied in computer-readable media containing instructions that, when executed by the processing unit 602, perform one or more of the methods 200, 300 illustrated and described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the route data 110, the navigation data 114, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof, does not include waves, signals, and/or other transitory and/or intangible communication media, per se.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing navigation route updates have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

I claim:

1. A method comprising:
  generating, at a server computer executing a routing service, route data corresponding to a navigation route;
  transmitting, by the server computer, the route data to a user device;
  obtaining, by the server computer, navigation data from a navigation data source;
  determining, by the server computer based upon the navigation data, expected conditions corresponding to conditions expected to exist at a point of time in the future;
  projecting, by the server computer, route conditions based upon the navigation data and the expected conditions;
  determining, by the server computer based upon the navigation data and the route conditions, if the navigation route is to be modified; and
  in response to determining that the navigation route is to be modified,
    generating, by the server computer, a modified route, and
    transmitting, by the server computer to the user device, updated route data corresponding to the modified route.

2. The method of claim 1, wherein the navigation data is obtained from a plurality of navigation data sources comprising the user device, the server computer, a social networking service, and a device associated with a road authority.

3. The method of claim 2, wherein the navigation data comprises data indicating
a location of the user device,
a speed of movement of the user device,
a bearing of the user device,
map data,
road capacity data,
speed limit data, and
traffic-related data obtained by analyzing a social networking post associated with the social networking service.

4. The method of claim 3, wherein the traffic-related data comprises information mined from a social networking post, the information comprising
a word that identifies a traffic-related condition, and
data indicating a geographic location associated with the traffic-related condition.

5. The method of claim 1, wherein generating the modified route comprises determining, based upon the expected conditions and the navigation data, a route for avoiding a traffic related condition that is expected to be encountered along the navigation route.

6. The method of claim 5, further comprising:
presenting, on a user interface for displaying a map display,
a road incident indicator that, when selected by a user, causes the user device to display a road incident information display; and
in response to detecting selection of the road incident information display, presenting
an indication of a type of road incident that exists,
data indicating at least one of the plurality of navigation data sources,
an option to ignore the road incident indicator, and
an option to generate the modified route to avoid the road incident.

7. The method of claim 1, wherein the navigation data source comprises a social networking service, and wherein the navigation data comprises a social networking post.

8. A method comprising:
obtaining, at a server computer, navigation data from a navigation data source;
determining, based upon the navigation data, expected conditions corresponding to conditions expected to exist at a point of time in the future;
projecting route conditions based, at least partially, upon the navigation data and the expected conditions;
determining, by the server computer based upon the navigation data, if a navigation route is to be modified; and
in response to determining that the navigation route is to be modified,
generating, by the server computer, a modified route, and
transmitting, by the server computer to a user device, updated route data corresponding to the modified route.

9. The method of claim 8, wherein the server computer executes a routing service to generate route data corresponding to the navigation route, wherein the server computer transmits the route data to the user device, and wherein the navigation data is obtained from a plurality of navigation data sources.

10. The method of claim 8, wherein the navigation data source comprises the user device.

11. The method of claim 10, wherein the navigation data comprises data indicating a location of the user device, a speed of movement of the user device, and a bearing of the user device.

12. The method of claim 8, wherein the navigation data source comprises a social networking service.

13. The method of claim 12, wherein the navigation data comprises a social networking post, wherein the social networking post comprises a word identifying a traffic-related condition, and wherein the social networking post further comprises data indicating a geographic location associated with the traffic-related condition.

14. The method of claim 8, wherein generating the modified route comprises determining, based upon the expected conditions and the navigation data, a route for avoiding a traffic related condition that is expected to be encountered along the navigation route.

15. A system comprising:
a processor; and
a memory device that stores computer-executable instructions that, when executed by the processor, cause the processor to perform operations comprising
generating route data corresponding to a navigation route,
transmitting the route data to a user device,
obtaining navigation data from a navigation data source,
determining, based upon the navigation data, expected conditions corresponding to conditions expected to exist at a point of time in the future,
projecting route conditions based upon the navigation data and the expected conditions,
determining, based upon the navigation data and the route conditions, if the navigation route is to be modified, and
in response to a determination that the navigation route is to be modified,
generating a modified route, and
transmitting, to the user device, updated route data corresponding to the modified route.

16. The system of claim 15, wherein the navigation data source comprises the user device.

17. The system of claim 16, wherein the navigation data comprises data indicating a location of the user device, a speed of movement of the user device, a bearing of the user device, and map data.

18. The system of claim 15, wherein the navigation data source comprises a social networking service, and wherein the navigation data comprises a social networking post.

19. The system of claim 18, further comprising a device that analyzes the social networking post to
search for a word identifying a traffic-related condition, and
identify a geographic location associated with the traffic-related condition.

20. The system of claim 15, wherein the navigation data source comprises the memory device.

* * * * *